United States Patent
Tang et al.

[11] Patent Number: 6,057,252
[45] Date of Patent: *May 2, 2000

[54] LOAD LEVELING YARNS AND WEBBINGS

[75] Inventors: Weiming Tang, Lake Hiawatha; Frank Mares, Whippany; Robert Clark Morgan, Summit, all of N.J.

[73] Assignee: AlliedSignal Inc., Morristown, N.J.

[ * ] Notice: This patent is subject to a terminal disclaimer.

[21] Appl. No.: 09/042,158

[22] Filed: Mar. 13, 1998

Related U.S. Application Data

[63] Continuation of application No. 08/819,931, Mar. 18, 1997, Pat. No. 5,830,811.

[51] Int. Cl.⁷ .................................................. D03D 3/00
[52] U.S. Cl. ........................... 442/216; 57/243; 280/805; 297/471
[58] Field of Search ............................. 442/216; 57/243; 280/805; 297/471

[56] References Cited

U.S. PATENT DOCUMENTS

| | | | |
|---|---|---|---|
| 3,296,062 | 1/1967 | Truslow | 161/91 |
| 3,322,163 | 5/1967 | Hughes | 139/383 |
| 3,464,459 | 9/1969 | Ballard | 139/383 |

(List continued on next page.)

FOREIGN PATENT DOCUMENTS

| | | |
|---|---|---|
| 208131 | 6/1986 | European Pat. Off. . |
| 697428 | 8/1995 | European Pat. Off. . |
| 4115 | 2/1973 | Japan . |

(List continued on next page.)

OTHER PUBLICATIONS

Journal of Polymer Science 12, (1974) "Viscosity–Molecular Weight Relationship for Fractional Poly(ethylene Terephthalate", by William L. Hergenrother & Charles J. Nelson, pp. 2905–2915.

Textile Research Journal 66(11), (1996) "Effects of Molecular Weight on Melt Spinning and Mechanical Properties of High Performance Poly(ethylene Terephthalate) Fibers", by Andrzej Ziabicki, pp. 705–712.

(List continued on next page.)

*Primary Examiner*—Terrel Morris
*Assistant Examiner*—Cheryl Juska
*Attorney, Agent, or Firm*—Melanie L. Brown; Virginia S. Andrews; Roger H. Criss

[57] ABSTRACT

The present invention provides load leveling and impact energy absorption webbing comprising warp yarn. If the webbing is used in seat belts, the webbing provides load leveling behavior from about 450 pounds (about 2,000 Newtons) to about 1,800 pounds (about 8,000 Newtons) in vehicle collision. The yarn has a force-displacement profile such that: (a) when the yarn is subjected to an initial barrier stress of from about 0.2 gram/denier to less than or equal to about 1.4 grams/denier, the yarn elongates to less than 3 percent and the initial modulus ranges from about 20 grams/denier to about 150 grams/denier; (b) upon subjecting the yarn to greater than the initial barrier stress and less than or equal to 1.8 grams/denier, the yarn elongates further to at least about 10 percent and the energy absorbed from 0 to the elongation at 1.8 grams/denier is at least about 0.0008 Joule/denier·meter; and (c) upon subjecting the yarn to greater than 1.8 grams/denier, the modulus increases sharply and the yarn elongates further until the yarn breaks at a tensile strength of at least about 5 grams/denier, wherein the yarn comprises a multiplicity of fibers, all of said warp yarns having substantially the same force-displacement profile, are made from polymer having a glass transition temperature in the range from about −40° C. to about +70° C., and are not made from polybutylene terephthalate homopolymer.

The web may be used for safety restraining webs for seat belts, parachute harnesses and lines, shoulder harnesses, cargo handling, safety nets, trampolines, safety belts or harnesses for workers at high attitudes, military arrestor tapes for slowing aircraft, ski tow lines, and in cordage applications such as for yacht mooring or oil derrick mooring.

16 Claims, 9 Drawing Sheets

U.S. PATENT DOCUMENTS

| | | | |
|---|---|---|---|
| 3,486,791 | 12/1969 | Stoffel et al. | 297/386 |
| 3,530,904 | 9/1970 | Ballard | 139/383 |
| 3,550,957 | 12/1970 | Radke et al. | 297/386 |
| 3,756,288 | 9/1973 | Seo et al. | 139/383 |
| 3,823,748 | 7/1974 | Allman et al. | 139/383 |
| 3,872,895 | 3/1975 | Takada | 139/383 |
| 3,926,227 | 12/1975 | Takada et al. | 139/383 |
| 3,927,167 | 12/1975 | Reese | 264/210 |
| 3,957,905 | 5/1976 | Sumoto et al. | 260/860 |
| 4,031,165 | 6/1977 | Saiki et al. | 260/860 |
| 4,045,401 | 8/1977 | Steumark et al. | 260/42.18 |
| 4,110,411 | 8/1978 | Imanaka et al. . | |
| 4,138,157 | 2/1979 | Pickett et al. | 297/386 |
| 4,228,829 | 10/1980 | Kikuchi | 139/408 |
| 4,500,686 | 2/1985 | Kobayashi et al. | 525/408 |
| 4,584,353 | 4/1986 | Kobayashi et al. | 525/438 |
| 4,670,498 | 6/1987 | Furusawa et al. | 524/381 |
| 4,670,510 | 6/1987 | Kobayashi et al. | 525/89 |
| 4,694,049 | 9/1987 | Morita et al. . | |
| 4,710,423 | 12/1987 | Imamura | 428/272 |
| 5,376,440 | 12/1994 | Koseki | 428/229 |
| 5,397,527 | 3/1995 | Rim et al. | 264/210.8 |
| 5,547,143 | 8/1996 | Miller, III et al. | 242/379 |
| 5,645,077 | 7/1997 | Matsunega et al. | 442/415 |
| 5,656,700 | 8/1997 | Kagi et al. | 525/437 |
| 5,716,568 | 2/1998 | Kaegi et al. | 264/103 |
| 5,830,811 | 11/1998 | Tang et al. | 442/216 |

FOREIGN PATENT DOCUMENTS

| | | |
|---|---|---|
| 4116 | 2/1973 | Japan . |
| 49037 | 12/1977 | Japan . |
| 157117 | 9/1984 | Japan . |
| 253764 | 9/1984 | Japan . |
| 298209 | 12/1989 | Japan . |
| 252729 | 10/1990 | Japan . |
| 259918 | 11/1991 | Japan . |
| 72325 | 3/1992 | Japan . |
| 27268 | 5/1992 | Japan . |
| 264156 | 9/1992 | Japan . |
| 57302 | 8/1993 | Japan . |
| 6257062 | 9/1994 | Japan . |
| 7090717 | 4/1995 | Japan . |
| 907017 | 4/1995 | Japan . |

OTHER PUBLICATIONS

Journal of Applied Polymer Science 22 (1978) "Molecular Weight–Viscosity Relationships for Poly (1 4–butylene Terephthalate)", by W.F.H. Borman, pp. 2119–2126.

Principles of Polymer Chemistry by Paul J. Flory (1953) pp. 308–310.

Textile Research Institute, "Identifying Critical Process Variables in Poly(ethylene Terephthalate Melt Spinning", by A. Dutta & V. Nadkarni, (Jan. 1984) pp. 35–42.

International Search Report for PCT/US97/23673 (dated Jun. 29, 1998).

LOAD LEVELING YARNS AND WEBBINGS

This application is a continuation of application Ser. No. 08/819,931, filed on Mar. 18, 1997, now U.S. Pat. No. 5,830,811.

BACKGROUND OF THE INVENTION

A typical vehicle safety seat belt system is designed to restrict the displacement of an occupant with respect to the occupant's seated position within the vehicle when the vehicle experiences a sudden, sharp deceleration. See commonly assigned U.S. Pat. No. 3,322,163. A typical seat belt system has three main portions: the retractor belt, the torso belt, and the lap belt and the performance of each belt may be characterized by its force-displacement curve. The area under the force-displacement curve is referred to as the energy absorbed by the safety restraint.

Current vehicle safety seat belts are made from fully drawn polyethylene terephthalate ("PET") fiber which is partially relaxed (2.7%) and having a tenacity of at least 7.5 g/denier and 14% elongation at break. However, a problem exists with current PET fiber seat belts. Crash studies indicate that after the initial vehicle impact occurs (e.g. speed of about 35 miles/hr), the occupant tends to move forward from his seated position until the belt engages to build restraining forces. As indicated in FIG. 1, the relatively unyielding belt made from PET fiber exerts a load of at least 2000 pounds (about 9000 Newtons) against the occupant so as to cause the occupant to have chest and rib cage injuries at the seat belt torso position and also neck and back injuries when the occupant rebounds and impacts the back structure of the seat assembly.

U.S. Government regulation requires that seat belts must withstand loads up to 6,000 lbs. When a car collides at a speed of 35 miles/hour, an impact energy to which an average sized person in the car is subjected is at least 500 Joules on the torso belt. Although the current PET fiber may absorb the impact energy, damage to the vehicle occupant still occurs due to the undesirable force-displacement curve. In 70 milliseconds, an average sized passenger will experience high forces of up to 2,000 pounds (about 9,000 Newtons) as shown in FIG. 1.

In order to absorb the impact energy and to reduce the seat belt load against the vehicle occupant, U.S. Pat. No. 3,550,957 discloses a shoulder harness having stitched doubled sections of the webbing arranged above the shoulder of the occupant so that the stitching permits the webbing to elongate from an initial length toward a final length at a controlled rate under the influence of a predetermined restraining force. However, the stitched sections do not give the desirable amount of energy absorption, do not provide uniform response, and are not reusable. See also U.S. Pat. No. 4,138,157.

U.S. Pat. No. 3,530,904 discloses a woven fabric which is constructed by weaving two kinds of yarns having relatively different physical properties and demonstrates energy absorption capability. U.S. Pat. Nos. 3,296,062; 3,464,459; 3,756,288; 3,823,748; 3,872,895; 3,926,227; 4,228,829; 5,376,440; and Japanese Patent 4-257336 further disclose webbings which are constructed of multiple kinds of warp yarns having different tenacity and elongations at break. The webbing shows multiple step gives and impact absorbent characteristics. Those skilled in this technical area have recognized the deficiencies in using at least two different yarn types as taught by the preceding references. U.S. Pat. No. 4,710,423 and Kokai Patent Publication 298209 published Dec. 1, 1989 ("Publication 298209") teach that when using at least two different yarn types, energy absorption occurs in a stepwise manner and thus, the web does not absorb the energy continuously and smoothly. Therefore, after one type of warps absorbs a portion of the impact energy, and before another type of warps absorbs another portion of the impact energy, the human body is exposed to an undesirable shock. In addition, these types of seat belts are not reusable.

U.S. Pat. No. 3,486,791 discloses energy absorbing devices such as a rolled up device which separates a slack section of the belt from the taut body restraining section by clamping means which yield under a predetermined restraining force to gradually feed out the slack section so that the taut section elongates permitting the restrained body to move at a controlled velocity. The reference also describes a device which anchors the belt to the vehicle by an anchor member attached to the belt and embedded in a solid plastic energy absorber. These kinds of mechanical devices are expensive, are not reusable, provide poor energy absorption, and are difficult to control. An improvement on the foregoing devices is taught by commonly assigned U.S. Pat. No. 5,547,143 which describes a load absorbing retractor comprising: a rotating spool or reel, seat belt webbing secured to the reel; and at least one movable bushing, responsive to loads generated during a collision situation, for deforming a portion of the reel and in so doing dissipating a determined amount of the energy.

U.S. Pat. No. 4,710,423 and Publication 298209 disclose webbing comprised of PET yarns having tenacity of at least 4 grams/denier and an ultimate elongation of from 50% to 80%. Due to the inherent physical properties of PET yarn, the Examples show that, at 5% elongation, the load has already reached more than 700 kg (about 1500 lbs). The damage to the occupant by seat belt still exists and thus, the belt needs to be further modified. Examples in these two patents also show that if PET yarn is overrelaxed, the tenacity drops to 2.3 g/denier.

Kokai Patent Publication 90717 published Apr. 4, 1995 discloses high strength polybutylene terephathalate homopolymer ("PBT") fiber based energy absorption webbing. The fiber's tenacity is over 5.8 g/denier, breaking elongation is over 18.0%, and the stress at 10% elongation is less than 3.0 g/d. However, this reference fails to teach PBT fiber demonstrating the initial stress requirement which engages the seat belt to protect the occupant and the means to control the initial stress barrier.

It would be desirable to have an improved energy absorbing seat belt which has a smoother performance than that of the known stitched webbing approach or the known use of at least two different fibers, is reusable unlike the known clamp approach, and also addresses the ability to control the initial barrier stress and the impact energy absorption.

SUMMARY OF THE INVENTION

We have developed webbings which respond to the foregoing need in the art. The webbings, if used in seat belts, demonstrate different load leveling behavior from about 450 pounds (about 2,000 Newtons) to about 1,800 pounds (about 8,000 Newtons) in a vehicle collision. In order to meet these requirements, the web comprises warp yarn and the warp yarn has a force-displacement profile characterized by: (a) when the yarn is subjected to an initial barrier stress of from about 0.2 gram/denier to less than or equal to about 1.4 grams/denier, the yarn elongates to less than 3 percent and the initial modulus ranges from about 20 grams/denier to about 150 grams/denier; (b) upon subjecting the yarn to greater than the initial barrier stress and less than or equal to 1.8 grams/denier, the yarn elongates further to at least about 10 percent and the energy absorbed from 0 to the elongation at 1.8 grams/denier is at least 0.0008 Joule/denier·meter; and (c) upon subjecting the yarn to greater than 1.8 grams/denier, the modulus increases sharply and the yarn elongates further until the yarn breaks at a tensile strength of at least about 5 grams/denier, wherein the yarn comprises a multiplicity of fibers, all of said warp yarns having substantially the same force-displacement profile, are made from polymers having a glass transition temperature in the range from about −40° C. to about +70° C., and are not made from polybutylene terephthalate homopolymer.

The term "modulus" as used herein means the slope of the force-displacement curve.

FIG. 2 illustrates the force-displacement profile of one of the present yarns and webbings. The initial barrier stress is indicated as IBS on FIG. 2. The present web is advantageous because it has better impact energy absorption and a smoother performance than that of the known stitched webbing approach or the known use of at least two different fibers, is reusable unlike the known clamp approach, and also addresses the ability to control the initial barrier stress and the impact energy absorption.

Other advantages of the present invention will be apparent from the following description, attached drawings, and attached claims.

DETAILED DESCRIPTION OF THE PREFERRED EMBODIMENTS

Figure 1:
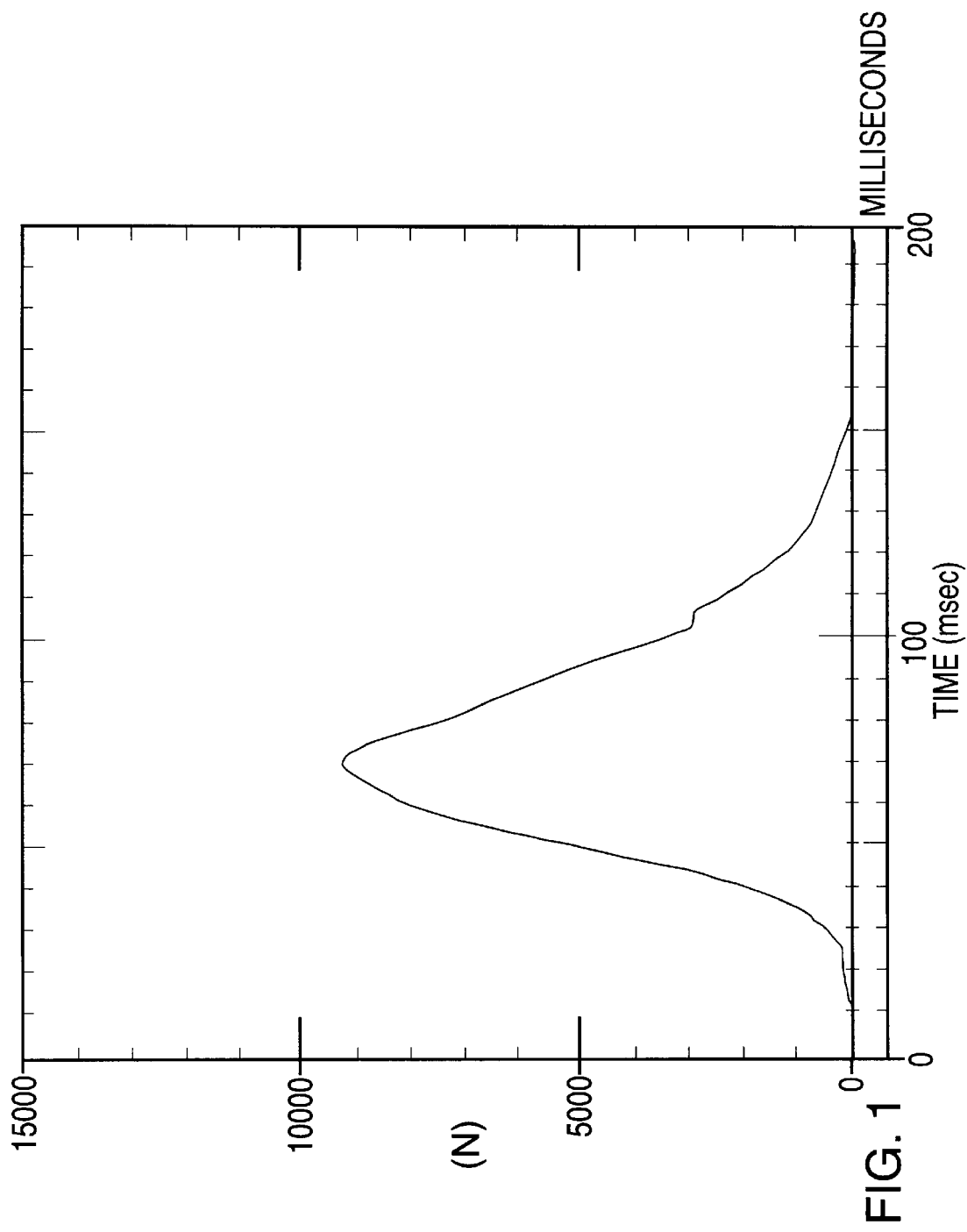
FIG. 1 shows the performance of a known PET seat belt at the torso position.
Figure 2:
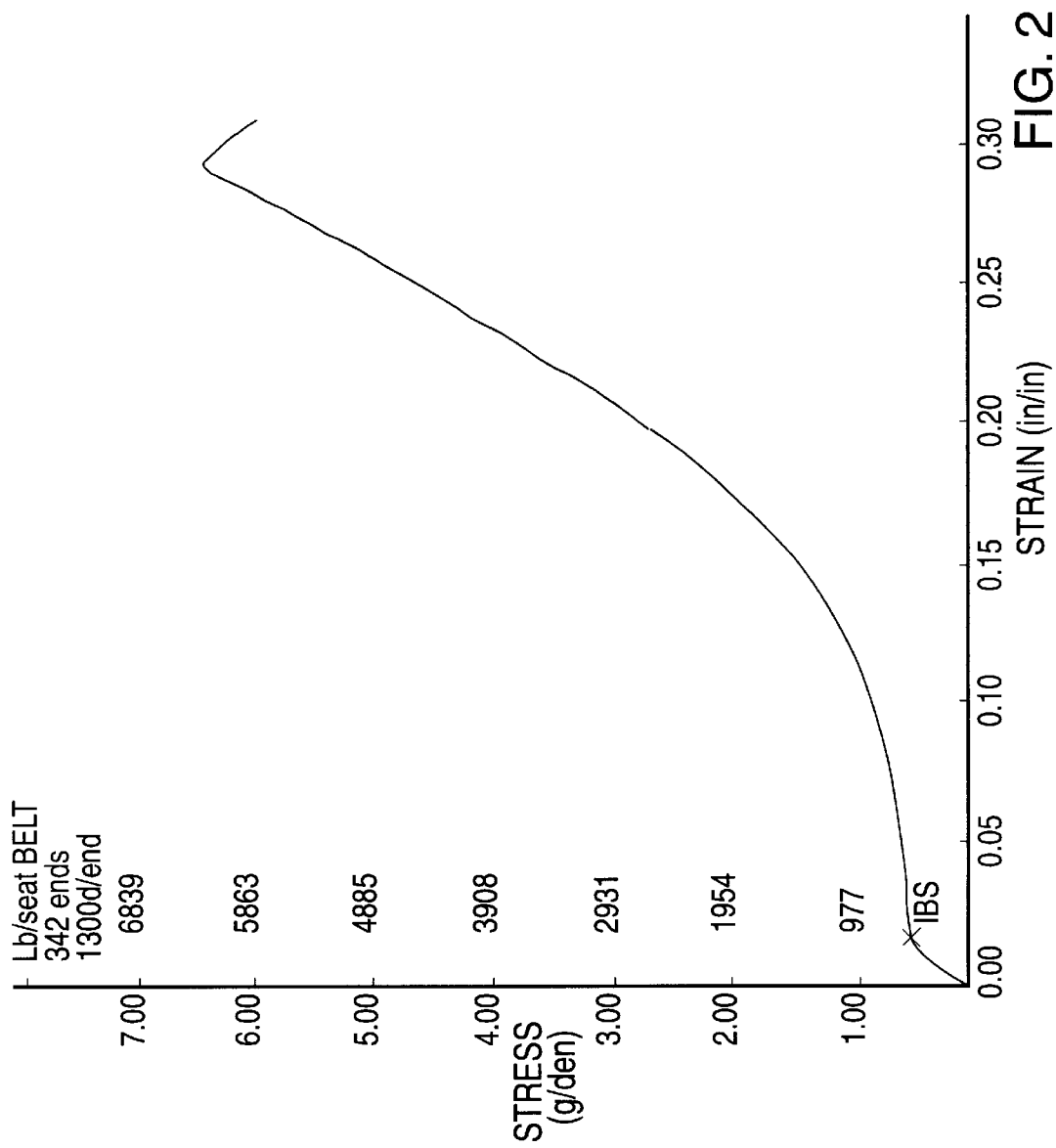
FIG. 2 illustrates the force-displacement profile of one of the present yarns and webbings.

The present yarn has the following force-displacement profile.

(a) When the yarn is subjected to an initial barrier stress of from about 0.2 gram/denier to less than or equal to about 1.4 grams/denier, the yarn elongates to less than 3 percent. The initial modulus ranges from about 20 grams/denier to about 150 grams/denier and the preferred initial modulus ranges from about 50 grams/denier to about 150 grams/denier. The initial high modulus is needed to engage the seat belt and the height of the initial barrier stress ensures that all the occupant collision energy will be absorbed under the subsequent load leveling portion of the force-displacement curve.

(b) Upon subjecting the yarn to greater than the initial barrier stress and less than or equal to 1.8 grams/denier, the yarn elongates further to at least about 10 percent. Preferably, the yarn elongates from about 3 percent to at least about 20 percent and the energy absorbed from 0 to the elongation at 1.8 grams/denier is at least 0.0008 Joule/denier·meter. This portion of the force-displacement curve is the fiber load leveling portion which prevents the passenger from experiencing excessive loads.

(c) Upon subjecting the yarn to greater than 1.8 grams/denier, the modulus increases sharply and the yarn elongates further until the yarn breaks at a tensile strength of at least about 5 grams/denier. In a seat belt assembly comprising the foregoing yarn, the load on the passenger's torso position may be reduced to as low as 450 lbs (about 2,000 Newtons) even at a collision speed of 35 miles/hour. The reduced force then minimizes or eliminates potential damage to the passenger.

The yarn is made from a polymer having a glass transition temperature in the range from about −40° C. to about +70° C., preferably about −20° to about +60° C., and more preferably about −10° C. to about +40° C. The polymer may be a homopolymer, random copolymer, diblock copolymer, triblock copolymer, or segmented block copolymer. Examples of preferred homopolymers include polytrimethylene terephthalate; polyisobutylene terephthalate; and long chain alkylene terephthalates and naphthalate polymers.

Examples of preferred random copolyesters include copolyester which, in addition to the ethylene terephthalate unit, contain components such as ethylene adipate, ethylene sebacate, or other long chain alkylene terephthalate units. This component is present in an amount greater than 10 percent.

Examples of preferred block copolymers include diblock, triblock, and segmented block structure. Block copolymers comprise at least one hard crystalline aromatic polyester block and at least one soft amorphous aliphatic polyester block. The crystalline aromatic polyester includes the homopolymers such as polyethylene terephthalate; polytrimethylene terephthalate; polybutylene terephthalate; polyisobutylene terephthalate; poly(2,2-dimethylpropylene terephthalate); poly[bis-(hydroxymethyl)cyclohexene terephthalate]; polyethylene naphthalate; polybutylene naphthalate; poly[bis-(hydroxymethyl)cyclohexene naphthalate]; other polyalkylene or polycycloalkylene naphthalates and the mixed polyesters which, in addition to the ethylene terephthalate unit, contain component such as ethylene isophthalate; ethylene adipate; ethylene sebacate; 1,4-cyclohexylene dimethylene terephthalate; or other long chain alkylene terephthalate units. A mixture of aromatic polyesters may also be used. The more preferred aromatic polyesters include PET and PEN. As for amorphous aliphatic polyester block, it is made from lactone monomer. ε-caprolactone is the most preferable. In addition, propiolactone, butyrolactone, valerolactone, higher cyclic lactones, and two or more types of lactones may also be used. When PBT is used, the amorphous aliphatic polyester block is present in an amount greater than 10 percent.

The disclosures of commonly assigned copending patent application Ser. No. 08/788,895 filed Jan. 22, 1997 (entitled DIBLOCK POLYESTER COPOLYMER AND PROCESS FOR MAKING) and commonly assigned continuation-in-part copending patent application Ser. No. 08/819,066 filed Mar. 18, 1997 (on even dated herewith) now U.S. Pat. No. 5,869,582 (entitled DIBLOCK POLYESTER COPOLYMER AND PROCESS FOR MAKING) are incorporated herein by reference.

Examples of preferred diblock copolymers include those comprising (a) a first block of polyester wherein the first block is made from aromatic polyester and (b) a second block of polyester wherein the second block is made from lactone monomer. More preferably, the aromatic polyester has: (i) an intrinsic viscosity which is measured in a 60/40 by weight mixture of phenol and tetrachloroethane and is at least about 0.6 deciliter/g and (ii) a Newtonian melt viscosity of at least about 7,000 poises at 280° C. Examples of preferred aromatic polyesters include polyethylene terephthalate ("PET"), polyethylene naphthalate ("PEN"); polybutylene terephthalate ("PBT"); polybutylene naphthalate; poly[bis-(hydroxymethyl)cyclohexene terephthalate]; poly[bis-(hydroxymethyl)cyclohexene naphthalate]; polytrimethylene terephthalate; polyisobutylene terephthalate; poly(2,2-dimethylpropylene terephthalate); other polyalkylene or polycycloalkylene naphthalates and the mixed polyesters which in addition to the ethylene terephthalate unit, contain components such as ethylene isophthalate, ethylene adipate, ethylene sebacate, 1,4-cyclohexylene dimethylene terephthalate, or other alkylene terephthalate units. A mixture of aromatic polyesters may also be used. Commercially available aromatic polyesters may be used. The more preferred aromatic polyesters include PET and PEN. The intrinsic viscosities, as measured in a 60/40 by weight mixture of phenol and tetrachloroethane, of the preferred aromatic polyesters are about 0.8 for PET and about 0.6 for PEN. The more preferred IV for PET is 0.9 and for PEN is 0.7. Preferred lactones include ε-caprolactone, propiolactone, butyrolactone, valerolactone, and higher cyclic lactones. Two or more types of lactones may be used simultaneously.

For use in load leveling seat belts, the PET-polycaprolactone diblock copolymer may have a polycaprolactone concentration of preferably about 10 to about 45 weight percent, and more preferably about 20 to about 30 weight percent. In the diblock copolymer, the polycaprolactone concentration may be varied to achieve the desired initial barrier stress and impact energy absorption with load leveling performance.

Catalysts used in the polymerization of lactones may be used in the diblock copolymerization. Preferred catalysts are organometallics based on metals such as lithium, sodium, potassium, rubidium, cesium, magnesium, inorganic acid salts, oxides organic acid salts and alkoxides of calcium, barium, strontium, zinc, aluminum, titanium, cobalt, germanium, tin, lead, antimony, arsenic, cerium, boron cadmium and manganese; and their organometallic complexes. More preferred catalysts are organic acid salts and organometallic compounds of tin, aluminum and titanium. The most preferred catalysts are tin diacylate, tin tetra acylate, dibutyltin oxide, dibutyltin dilaurate, tin octanoate, tin tetra acetate, triisobutyl aluminum, tetra butyl titanium, germanium dioxide, antimony trioxide, porphyrin and phthalocyanine complexes of these metals. Two or more catalyst types may be used in parallel. Useful catalysts are commercially available.

Preferably, the amount of catalyst used is about 0.01 to about 0.2 weight percent based on the combined weight of the aromatic polyester and lactone monomer.

The aromatic polyester is added to an extruder. The aromatic polyester may be melted and then added to the extruder or the aromatic polyester may be added to the extruder and then melted in the extruder. We have found that the preferred extruder is a twin screw extruder and thus, mixing and reaction of the polymeric melt with material having a drastic viscosity difference become feasible. Useful twin screw extruders are commercially available.

Preferred twin screw extruders are counter-rotation twin screw extruders providing a counter intermeshing mode, and thus, in comparison with other extruders, provide good dispersive mixing, tight residence time distribution, and effective devolatilization. The screw profile is designed to allow polyester pellet feeding, polyester pellet melting, lactone monomer injection, mixing, reaction, devolatilization, and finally pelletization or spinning. The extruder design also allows feeding of the starting aromatic polyester melt. The most efficient dispersive and distributive mixing must occur at the position where the lactone monomer is injected into the polyester melt.

The initial extrusion temperature exceeds the melting point (as measured by Perkin-Elmer Differential Scanning Calorimeter (DSC) from the maxima of the endotherm resulting from scanning a 2 mg. sample at 20° C. per minute) of the aromatic polyester used. The melting points of the preferred aromatic polyesters are 250° C. for PET and 266° C. for PEN. The preferred initial extrusion zone temperature is at least about 30° C. above the aromatic polyester melting point. Thus, the preferred initial extrusion temperature for PET is at least about 280° C. while the preferred initial extrusion temperature for PEN is at least about 296° C. To promote the diblock copolymer formation and minimize transesterification occurrence, the residence time and extrusion temperature profile are important.

After the aromatic polyester is melted, the melt temperature is decreased preferably by at least about 20° C. and more preferably by at least about 50° C. due to the mixing with the injected lactone monomer and catalyst. Preferably, the catalyst is added to the ε-caprolactone monomer at room temperature and the ε-caprolactone monomer/catalyst mixture is injected into the melted aromatic polyester. Thus, the reactive extrusion temperature for PET is preferably about 260° C. and more preferably about 230 to about 260° C. while the reactive extrusion temperature for PEN is preferably about 276° C. and more preferably about 246 to about 276° C.

The term "residence time" in the extruder as used herein means the extruder volume divided by the output rate. The aromatic polyester and lactone are extruded at a residence time of less than about 30 minutes and at a temperature sufficient to form the diblock copolymer. The preferred residence time is less than about 15 minutes. The more preferred residence time is less than about 10 minutes and the most preferred residence time is less than about 5 minutes. This short residence time minimizes transesterification while ensuring complete polymerization which means to graft the ε-caprolactone monomer to form the block at the PET chain end and complete consumption of the injected ε-caprolactone monomer. Turbulators are used to increase extruder volume without sacrificing the throughput rate and to control the residence reaction time. To determine residence distribution, we added colored pellets which served as a marker to the polyester pellets. The term "distribution time" means the range starting from the color appearance and ending at color disappearance. As those skilled in the art know, as the distribution time decreases, product uniformity increases. Thus, the preferred distribution time is less than about 4 minutes. The distribution time is more preferably less than about 2 minutes and most preferably less than about 1 minutes.

The fiber formation may be achieved by spinning either directly from twin screw extruder or separately from single screw extruder. Both processes consist of extrusion, spinning, drawing and relaxing stages. In the twin screw extruder, reaction and compounding may be conducted in polymer melt with a proper screw profile and process conditions. In the single screw extruder, the polymer pellets may be fed and melted with proper screw design and process conditions. A homogeneous melt is then fed into a spin pot which contains a screen pack and a spinnerette. The extrudated filaments go through a heated sleeve, are quenched by ambient air, and taken by godet at a certain speed. The as-spun yarn is then fully drawn to its maximum draw ratio to obtain the maximum strength. The relaxation stage shrinks the yarn and produces a yarn with the desired stress-strain curve. Fiber relaxation affects the maximum load which the passenger will experience in the vehicle collision. For example, using a PET/25% Polycaprolactone diblock copolymer, the load experienced by the passenger may change from about 1,500 pounds to about 900 pounds when the fully drawn fiber is relaxed from 5% to 15%.

Depending upon the intended use of the present web, additives such as UV stabilizers may be used in the fiber.

The term "multiplicity of fibers" as used herein means at least two ends of yarn and preferably, at least about 342 ends for seat belts.

Seat belts are usually woven with a warp yarn of about 1000 to about 1500 denier and a breaking strength of at least about 5 grams/denier and weft yarn with a denier of about 500 to 900 and a breaking strength of at least about 5 grams/denier. Weaving conditions are selected in order for the seat belt to preserve the stress/strain properties of the yarn and maintain the webbing strength. Our results indicate that the most desirable weaving pattern for energy absorption is a 2×2 twill webbing.

The present web provides the desired load-leveling characteristics in the absence of a clamping device such as taught by U.S. Pat. No. 3,486,791; stitching such as taught by U.S. Pat. No. 3,550,957; and a mechanical energy absorbing device such as the constant force retractor taught by commonly assigned U.S. Pat. No. 5,547,143. The present web and yarn provide the desired load-leveling characteristics and are made from material other than the PBT homopolymer taught by Publication 90717. The present web provides the desired load-leveling characteristics by using warp yarns having substantially the same force-displacement profile instead of the plurality of warp yarn force-displacement profiles taught by U.S. Pat. Nos. 3,756,288; 3,823,748; 3,872,895; 4,288,829; and 5,376,440. The present web provides the desired load-leveling characteristics and is made from polymer other than the PET homopolymer taught by U.S. Pat. No. 4,710,423 and Publication 298209.

The present web is useful for seat belts, parachute harnesses and lines, shoulder harnesses, cargo handling, safety nets, trampolines, safety belts or harnesses for workers at high attitudes, military arrestor tapes for slowing aircraft, ski tow lines, and in cordage applications such as for yacht mooring or oil derrick mooring.

Test Procedures

Tenacity is measured on an Instron equipped with two grips which hold the yarns at the gauge lengths of 10 inches. The yarn is then pulled by the strain rate of 10 inch/minute, the data are recorded by a load cell, and stress-strain curves are obtained. Tenacity is the breaking strength (in grams) divided by the yarn's denier.

The following examples are illustrative and not limiting.

INVENTIVE EXAMPLE 1

Dried PET pellets (IV=0.9; MV=15,000 poises at 280° C.) were fed into a counter-rotation twin screw extruder (diameter=27 mm, length=1404 mm) at the rate of 12 lbs/hr. The length of one zone was about 4 times the screw diameter. The pellets started to melt and were advanced forward by a pumping element. After PET melted, the premixed $\epsilon$-caprolactone and catalyst (tin octonate, 0.09 wt % of PET-caprolactone) were injected by a piston pump into the extruder into the melt at the rate of 4 lbs/hr. A forwarding mixer was located under the injection point. The injected liquid was quickly mixed with PET melt by both distributive and dispersive mixers. The mixture of PET and $\epsilon$-caprolactone was then forwarded into reaction zones and the reaction was completed with a residence time of 3.7 minutes. At the end of polymerization, the melt was devolatilized by a vacuum. The extrusion conditions are in Table I. The polymer melt (PET(75%)-polycaprolactone(25%)) was then either fed into a spin pot which contained a spinnerette to form fibers, or extruded through a three hole die, quenched into water, and cut into pellets. The diblock copolymer had a melting point of 231° C. and an IV=0.98 which demonstrates that the PET copolymerized with $\epsilon$-caprolactone.

TABLE I

| | Zone 1 (° C.) | Zone 2 (° C.) | Zone 3 (° C.) | Zone 4 (° C.) | Zone 5 (° C.) | Zone 6 (° C.) | Zone 7 (° C.) | Zone 8 (° C.) | Zone 9 (° C.) | Zone 10 (° C.) | Zone 11 (° C.) | Zone 12 (° C.) | Zone 13 (° C.) |
|---|---|---|---|---|---|---|---|---|---|---|---|---|---|
| 1 | 292 | 290 | 255 | 255 | 245 | 240 | 240 | 235 | 235 | 235 | 235 | 235 | 235 |
| 2 | 292 | 290 | 260 | 250 | 250 | 245 | 245 | 240 | 240 | 240 | 253 | 242 | 240 |

| Screw Speed (RPM) | Torque | Melt Temperature (° C.) | Melt Pressure (psi) | Vacuum (mbar) | Throughput (lbs/hr) | Residence Time (min) | Residence Time Distribution (min) |
|---|---|---|---|---|---|---|---|
| 150 | 48 | 256 | 60 | −1000 | 16 | 3.7 | 1 |
| 150 | 55 | 264 | 90 | −750 | 5 | 12 | Not determined |

Zone temperature had negligible deviation from set points.

TABLE II

| Inventive Example | $\epsilon$-Caprolactone (%) | Unreacted $\epsilon$-Caprolactone (%) | Diblock Copolymer Intrinsic Viscosity (dl/g) | Transesterification in Diblock Copolymer (%) |
|---|---|---|---|---|
| 1 | 25 | 0 | 0.98 | 5 |
| 2 | 15 | 0 | 0.94 | 6 |

INVENTIVE EXAMPLE 2

Dried PET pellets (IV=0.9; MV=15,000 poises at 280° C.) were fed into a counter-rotation twin screw extruder (diameter=27 mm; length=1404 mm) at the rate of 4.26 lbs/hr. The pellets started to melt and were advanced forward by pumping elements.

After PET melted, the premixed F-caprolactone and catalyst (tin octoate, 0.03 wt % of PET-caprolactone) were injected into the extruder by a piston pump at the rate of 0.75 lb/hr. The amount of ε-caprolactone in PET was 15 weight percent. The injected liquid was quickly mixed with PET melt back and forth by both distributive and dispersive combing mixers, assembled under the region of the injection port. ε-Caprolactone solubilized the PET melt and reduced the melt temperature of PET to 225° C.

The mixture of PET and F-caprolactone was forwarded into reaction zones. Turbulators in the reaction zones accommodated 61% of extrusion volume between turbulators and barrel. The total volume of extrusion and throughput rate (5.01/hr) dictated the residence time of about 12 minutes. The melt in the process of polymerization was under the continuous agitation of intermeshing turbulators and homogenization.

By the end of polymerization, the PET-polycaprolactone copolymer melt was fed into a devolatilizing zone under the vacuum (-750 mbar). The extrusion conditions are in Table I. The polymer (PET(85%)-polycaprolactone(15%)) was then extruded through a three hole die, quenched into water, and cut into pellets. The diblock copolymer had a melting point of 227° C. and an IV=0.94 which demonstrates that the PET copolymerized with ε-caprolactone.

For each of the following Examples, the formation of PET/Polycaprolactone fibers was achieved by spinning from a single screw extruder. The process consisted of extrusion, spinning, drawing, and relaxing stages. The polymer pellets were fed into a 1" MPM single screw extruder (L/D=30:1), equipped with a screw of having a long metering zone to stabilize melt pressure at the end of extruder. A reverse temperature profile was selected with a purpose to melt the pellets completely at first and second zones, decrease the melt temperature, and increase the melt viscosity before pumping into a spin pot. The spin pot contained a screen pack and a spinnerette with 25 round holes (0.024"×0.072"). The extrudated filaments went through a heated sleeve and were quenched by ambient air in a 5 meter stack. The yarn was then coated with a spin finish in the spinning line and taken by a godet at a certain speed to form a package. The as-spun yarn was then fully drawn under different conditions to its maximum draw ratio. The fully drawn yarn was then relaxed at high temperature to produce fiber with the desired stress-strain curve.

INVENTIVE EXAMPLE 3

The polymer pellets (Inventive Example 1, PET/25% Polycaprolactone) were dried and fed into the extruder with the temperature profile indicated in Table III at the screw speed 46 RPM. The extrusion conditions gave barrel pressure and spin pot pressure, 1200 psi and 500 psi, respectively. The as-spun yarn had 25 filaments and 1650 denier and was drawn under condition a in Table IV and had a tenacity of 7.8 g/denier. The fully drawn yarn was 200 denier with melting temperature at 224° C. The fully drawn yarn was then fed at a speed of 300 m/min onto the first roll at room temperature, moved onto the second roll at 135° C. with 1 second contact time and shrunk 15%, quenched on a room temperature roll, and sent to a winder. The relaxed yarn had a 230 denier.

Figure 3:
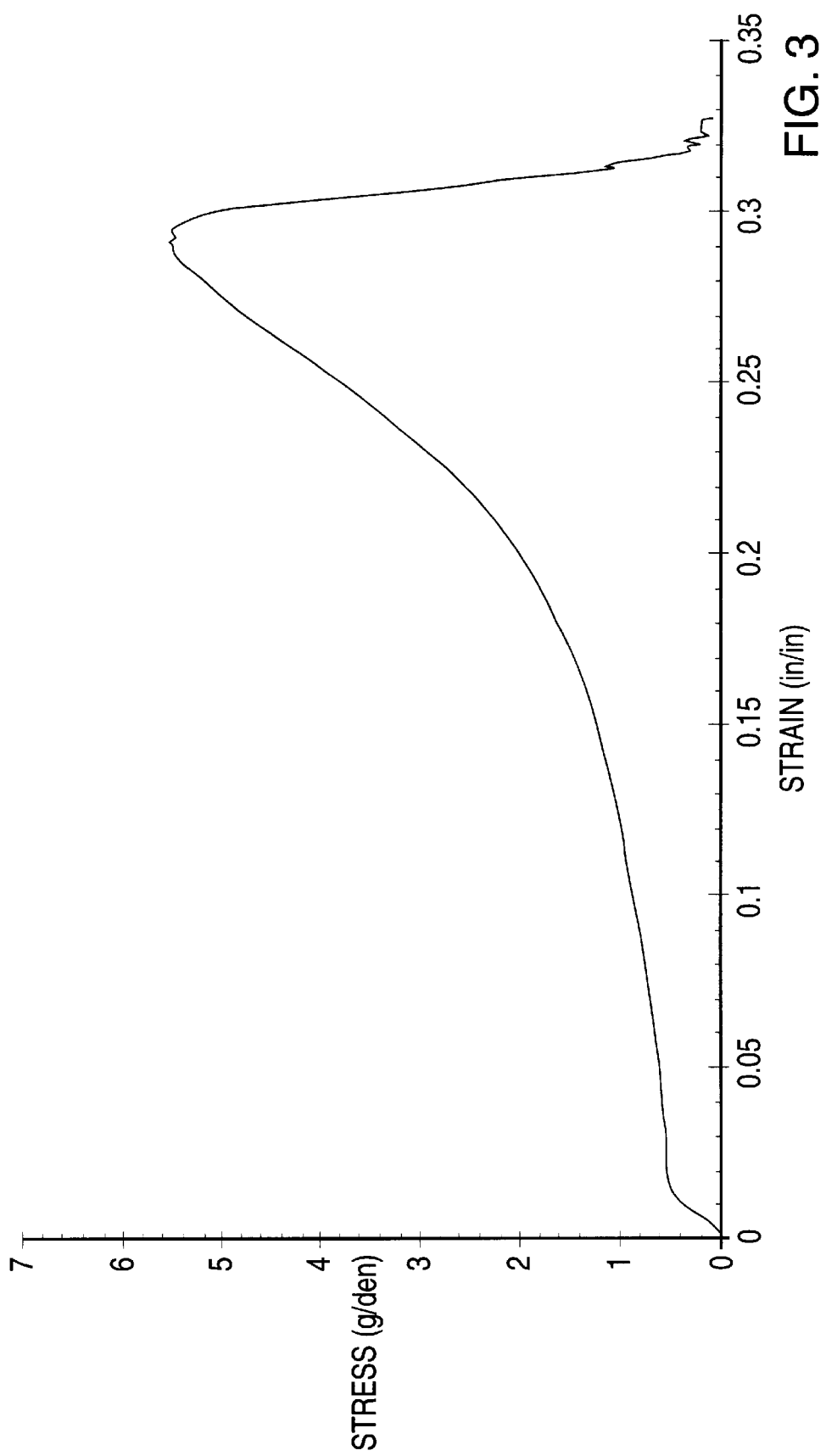
FIG. 3 illustrates the force-displacement profile of the yarn of Inventive Example 3.

The stress-strain curve for the yarn (PET/25% polycaprolactone) is shown in FIG. 3. When the yarn was subjected to an initial barrier stress of 0.6 gram/denier, the yarn elongated to less than 2 percent and the initial modulus was 52 grams/denier. When the yarn was subjected from 0.6 gram/denier to 1.8 grams/denier, the yarn elongated from 2 to 20 percent and the energy absorbed from 0 to 20 percent was 0.00174 Joule/denier·meter. Upon subjecting the yarn to greater than 1.8 grams/denier, the modulus increased sharply and the yarn elongated from 20 to 31 percent until the yarn broke at a tensile strength of 5.8 grams/denier.

INVENTIVE EXAMPLE 4

The polymer pellets (Inventive Example 2, PET/15%Polycaprolactone) were dried and fed into the extruder with the temperature profile indicated in Table III at the screw speed 40 RPM. The extrusion conditions gave barrel pressure and spin pot pressure, 800 psi and 400 psi, respectively. The as-spun yarn was then drawn under condition b in Table IV and gave a fiber with tenacity of 6.5 g/denier. The fully drawn yarn was 259 denier with melting temperature at 220° C. The above fully drawn yarn was fed at the speed of 300 m/min onto the first roll at room temperature, moved onto the second roll at 150° C. with 1 second contact time and shrunk 10%, quenched on a room temperature roll, and sent to a winder.

Figure 4:
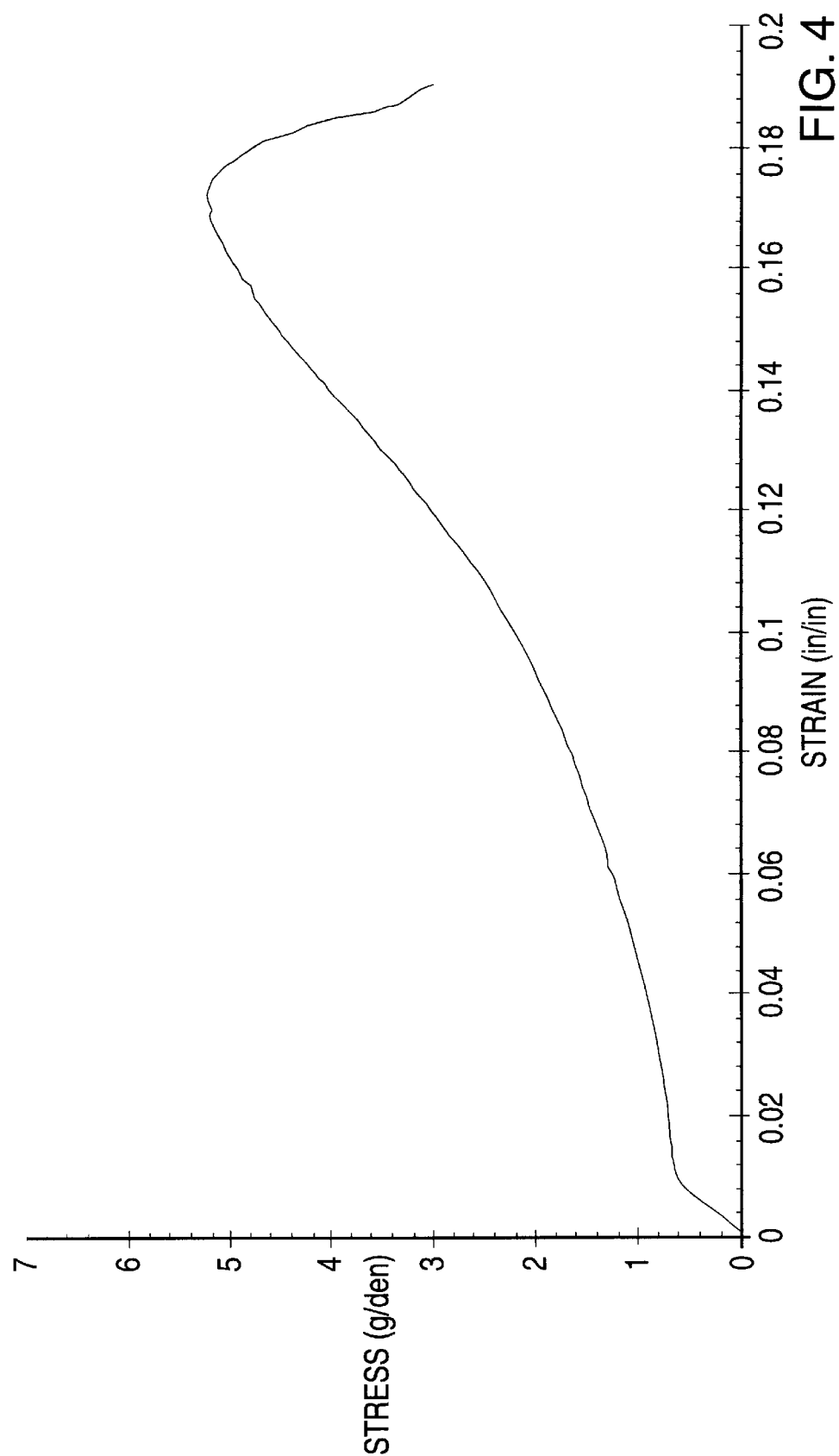
FIG. 4 illustrates the force-displacement profile of the yarn of Inventive Example 4.

See stress-strain curve for the yarn (PET/15% polycaprolactone) in FIG. 4. FIG. 4 shows the desired initial barrier stress. If the fiber is further relaxed to a total of 15%, the other desired inventive fiber properties may then be achieved.

INVENTIVE EXAMPLE 5

A diblock polymer (PET(70%)-polycaprolactone(30%)) was prepared in a manner similar to that set forth above. The polymer pellets (PET/30%Polycaprolactone) were dried and fed into the extruder with the temperature profile indicated in Table III at the screw speed of 42 RPM. The extrusion conditions gave barrel pressure and spin pot pressure, 900 psi and 500 psi, respectively. The as spun yarn was then drawn under condition c in Table IV and gave a fiber with tenacity of 5.9 g/denier. The fully drawn yarn was 271 denier with melting temperature at 220° C. The above fully drawn yarn was fed at the speed of 300 m/min onto the first roll at room temperature, moved onto the second roll at 150° C. with 1 second contact time and shrunk 10%, quenched on a room temperature roll, and sent to a winder.

Figure 5:
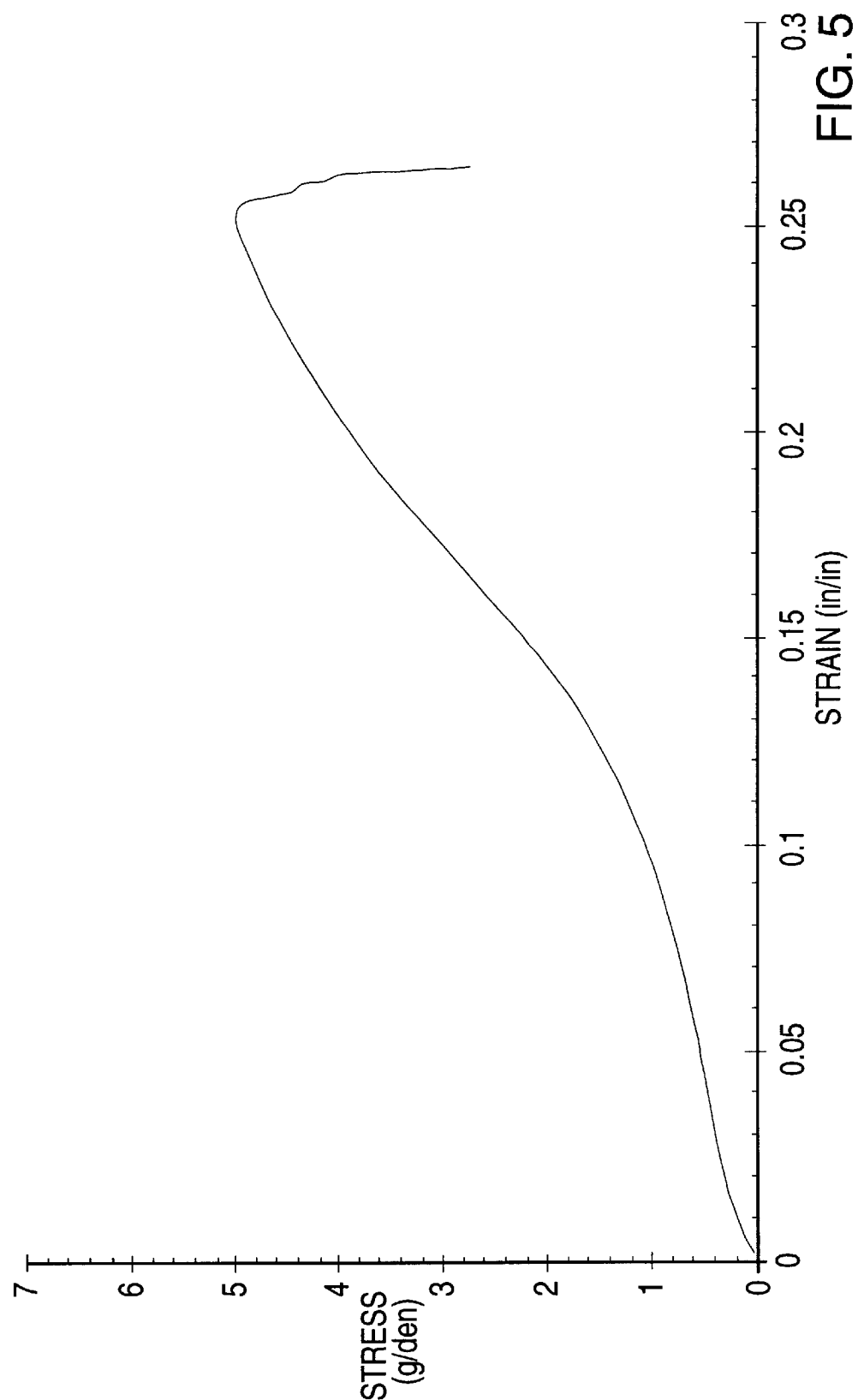
FIG. 5 illustrates the force-displacement profile of the yarn of Inventive Example 5.

The stress-strain curve for the yarn (PET/30% polycaprolactone) is shown in FIG. 5. When the yarn was subjected to an initial barrier stress of 0.2 gram/denier, the yarn elongated to less than 2 percent and the initial modulus was 20 grams/denier. When the yarn was subjected to from 0.2 gram/denier to less than or equal to 1.8 grams/denier, the yarn elongated from 2 to 14 percent and the energy absorbed from 0 to 14 percent was 0.00096 Joule/denier·meter. Upon subjecting the yarn to greater than 1.8 grams/denier, the modulus increased sharply and the yarn elongated from 14 to 26 percent until the yarn broke at at tensile strength of 5 grams/denier.

TABLE III

| Example | Extruder | | | | | | Throughput rate (g/min/hole) | Sleeve Temp (° C.) | Take up speed (m/min) |
| --- | --- | --- | --- | --- | --- | --- | --- | --- | --- |
| | Zone 1 (° C.) | Zone 2 (° C.) | Zone 3 (° C.) | Zone 4 (° C.) | Block (° C.) | Spin. (° C.) | | | |
| 3 | 277 | 277 | 277 | 270 | 260 | 260 | 2 | 185 | 280 |
| 4 | 304 | 293 | 293 | 288 | 271 | 271 | 1.6 | 200 | 180 |
| 5 | 260 | 260 | 260 | 254 | 260 | 260 | 1.6 | 200 | 180 |

TABLE IV

| Example | 1st Roll Temp (° C.) | wraps | Shoe Temp (° C.) | 2nd Roll Temp (° C.) | wraps | Draw Ratio |
| --- | --- | --- | --- | --- | --- | --- |
| a | 40 | 7 | 140 | 140 | 10 | 8.4 |
| b | 40 | 7 | 150 | 90 | 10 | 7.7 |
| c | 30 | 7 | 160 | 160 | 10 | 7.4 |

INVENTIVE EXAMPLE 6

Figure 6:
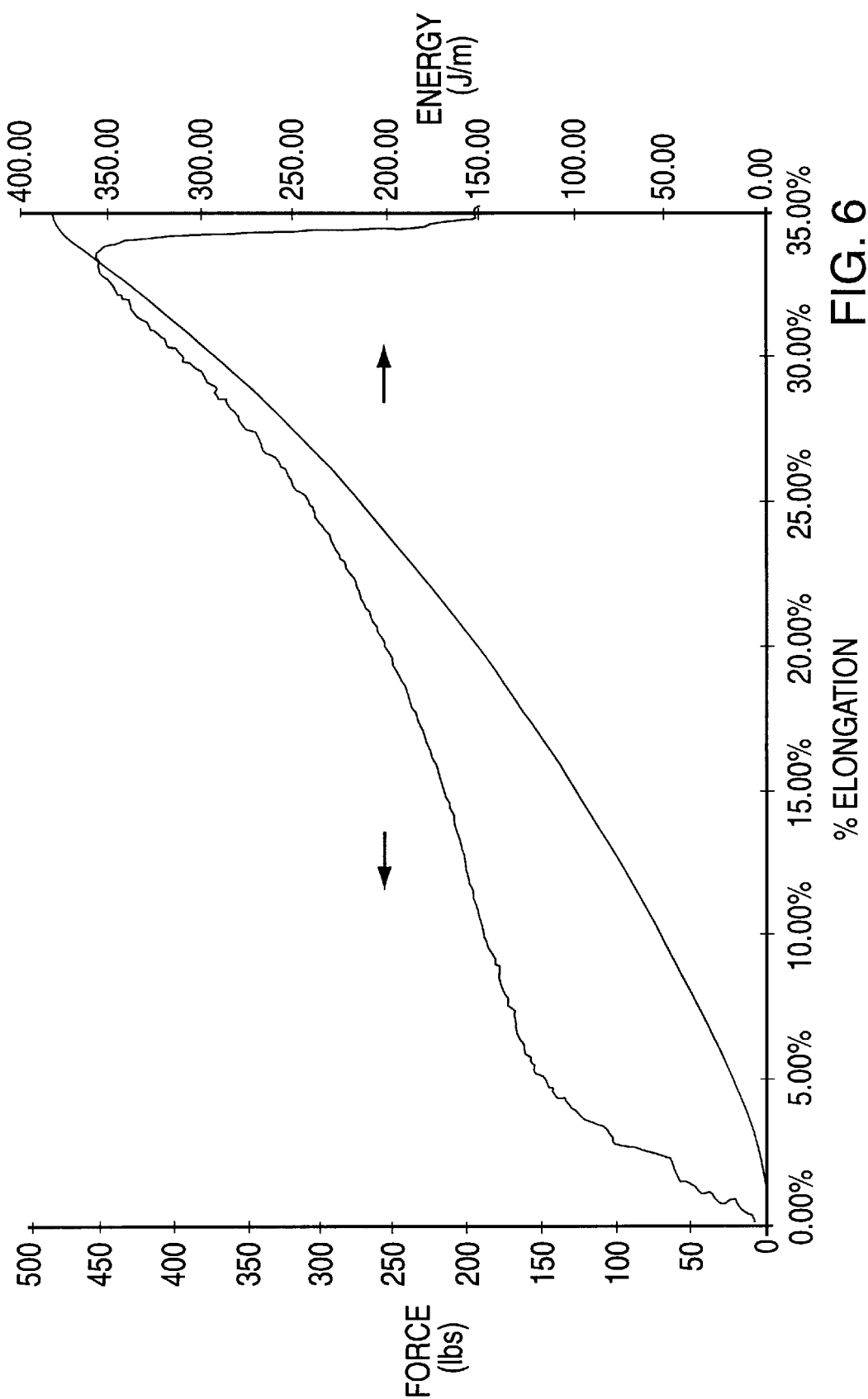
FIG. 6 illustrates the force-displacement-energy profile on a high speed Instron test of the 0.5 inch web of Inventive Example 6.

Based on the selection of 2×2 twill weaving pattern, 91 ends of 1400 denier PET/25%Polycaprolactone warp yarn from Inventive Example 3 were woven with 840 denier PET/25%Polycaprolactone weft yarn into ½ inch strip. The sample was tested on a high speed Instron at the loading rate of 2200 inch/min with a gauge length of 3 inch. This corresponded to the automotive collision at the rate of 35 miles/hr. FIG. 6 showed that the webbing elongated to the strain of 20% under the load up to 250 lbs, and the energy of 11.4 J was absorbed. This corresponded to that 663 J was absorbed by a torso seat belt (50 inch long, 2 inch wide) before load upon the passenger increased to 1000 lbs.

INVENTIVE EXAMPLE 7

Figure 7:
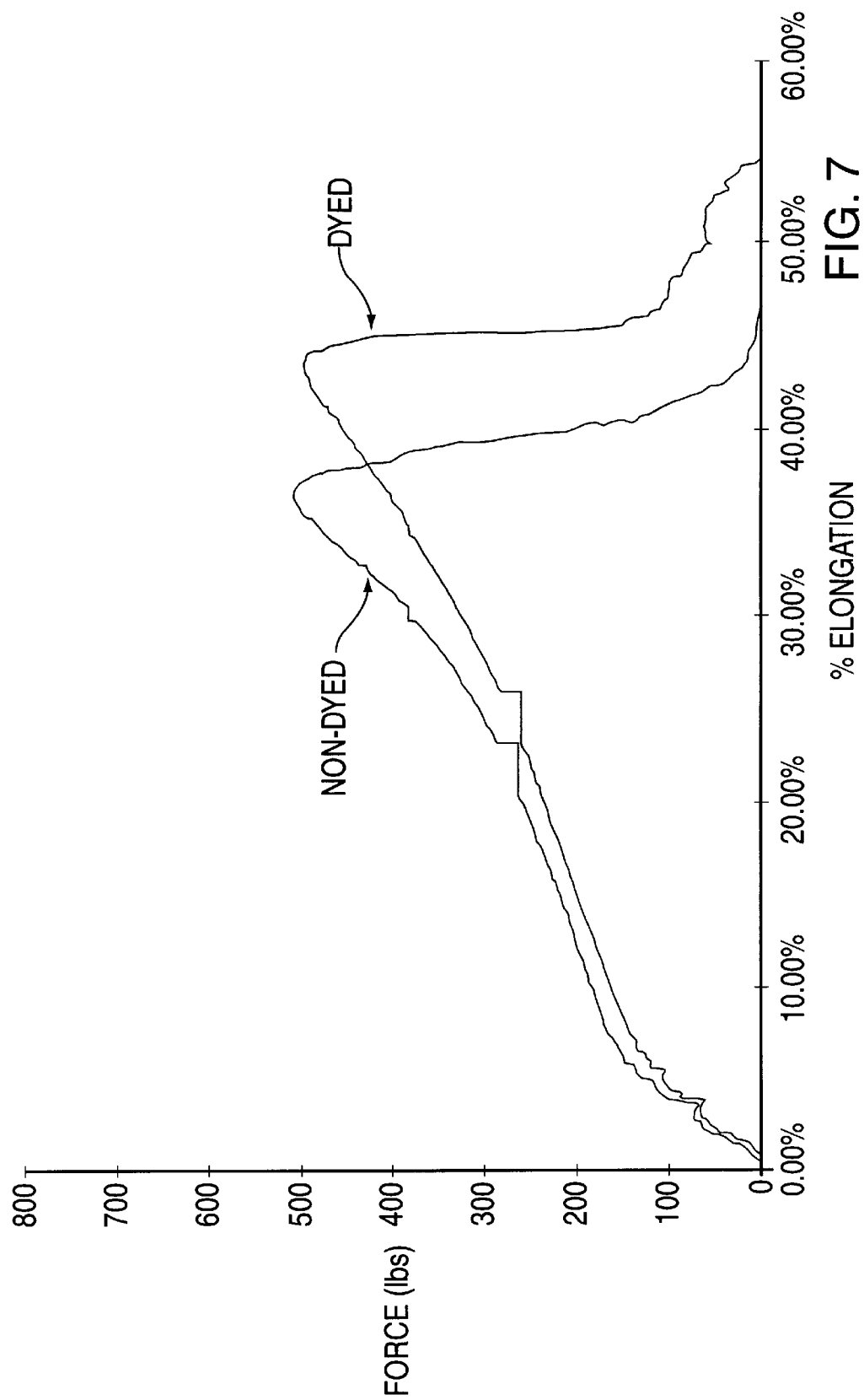
FIG. 7 illustrates the force-displacement-energy profile on a high speed Instron test of the 0.5 inch web of Inventive Example 7.

A 12 inch long PET/25%Polycaprolactone webbing (½ inch wide) from Inventive Example 6, mounted on a frame, was soaked in a red color bath for 10 minutes. The webbing with 30% wet pick up was then predried at 110° C. for 3 minutes and grieved at 120° C. for another 3 minutes. Finally, the dyed webbing was quenched to room temperature. The fibers pulled out from both warp and weft of webbing were analyzed under optical microscope. It clearly showed both warp and weft fiber were uniformly and deeply dyed. A minimum amount of shrinkage (<2%) from original dimension was observed. The high speed Instron test on the dyed webbing is shown in FIG. 7 and compared with undyed sample. The results indicated that the load leveling behavior was preserved in the dyeing process.

In the sled test, the full size woven seat belt (2 inch wide) was assembled into a cartridge with belt winding and locking functions. Then, the assembly was installed into a car and instrumented with load cells to measure the force on the seat belt.

COMPARATIVE EXAMPLE A

In order to establish a baseline for the tests at 35 miles/hr, a dummy (50th percentile hybrid) was belted with a 2 inch wide PET seat belt. At the moment of the simulated accident in a sled test, the load on seat belt peaked at 70 msec after collision. Maximum recorded force was 9200 N (2070 lb) on torso position as shown in FIG. 1.

INCENTIVE EXAMPLE 8

Figure 8:
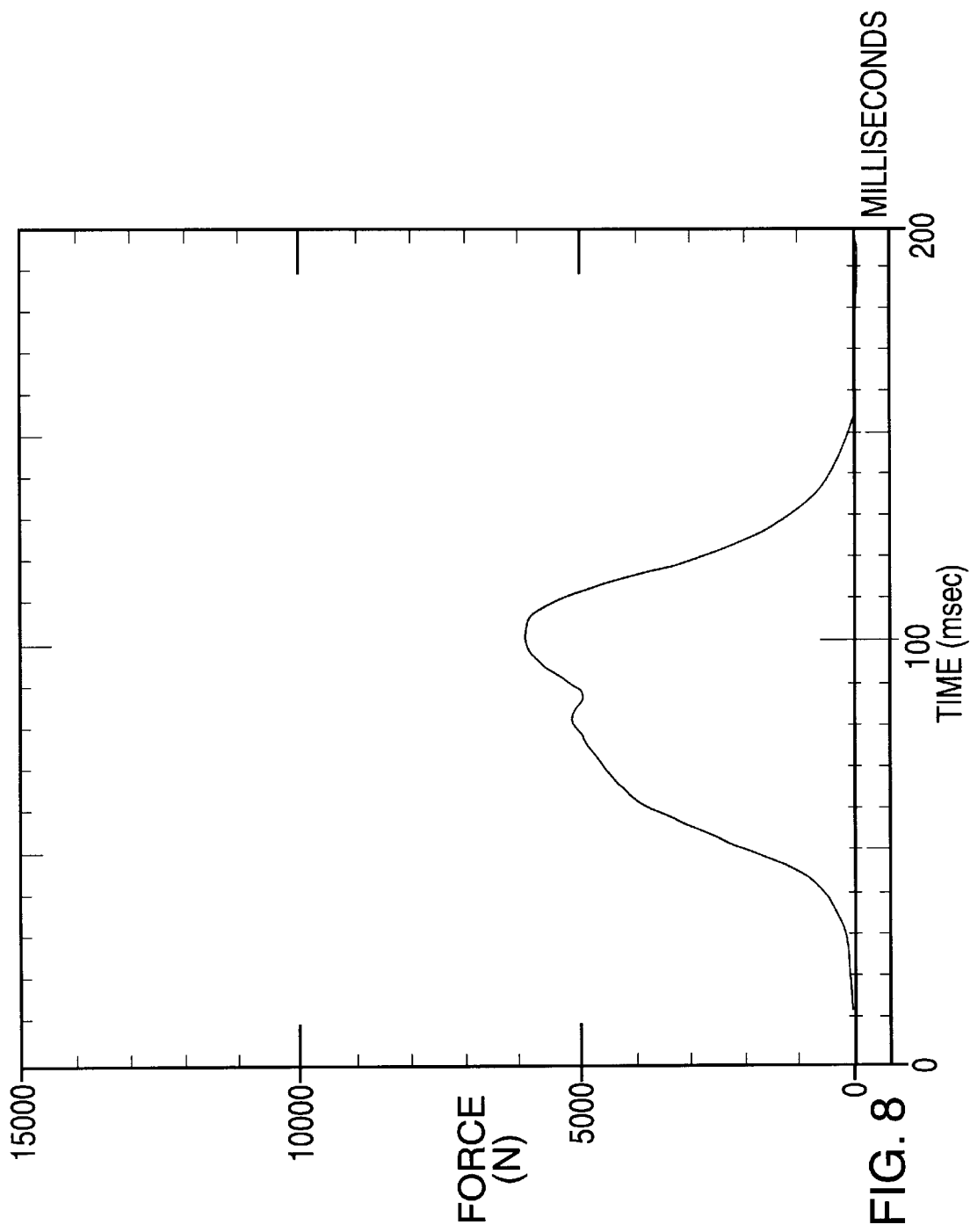
FIG. 8 illustrates the performance of the web of Inventive Example 8 at the torso position.

342 ends of 1500 denier PET/25%Polycaprolactone warp yarn from Inventive Example 3 were woven with 500 denier PET/25%Polycaprolactone weft yarn from Inventive Example 3 into 2 inch wide seat belt in a 2×2 twill pattern. The seat belt was tested with a dummy (50th percentile hybrid). At 35 miles/hour speed, the time when the force peaked was delayed to 100 msec after collision. Maximum measured forces was 5700 N (1280 lb) on the torso position. As shown in FIG. 8, the new webbing performed well and showed load leveling behavior at 5,700 Newtons which is in sharp contrast to the undesirable performance of Comparative Example A in FIG. 1.

INVENTIVE EXAMPLE 9

Figure 9:
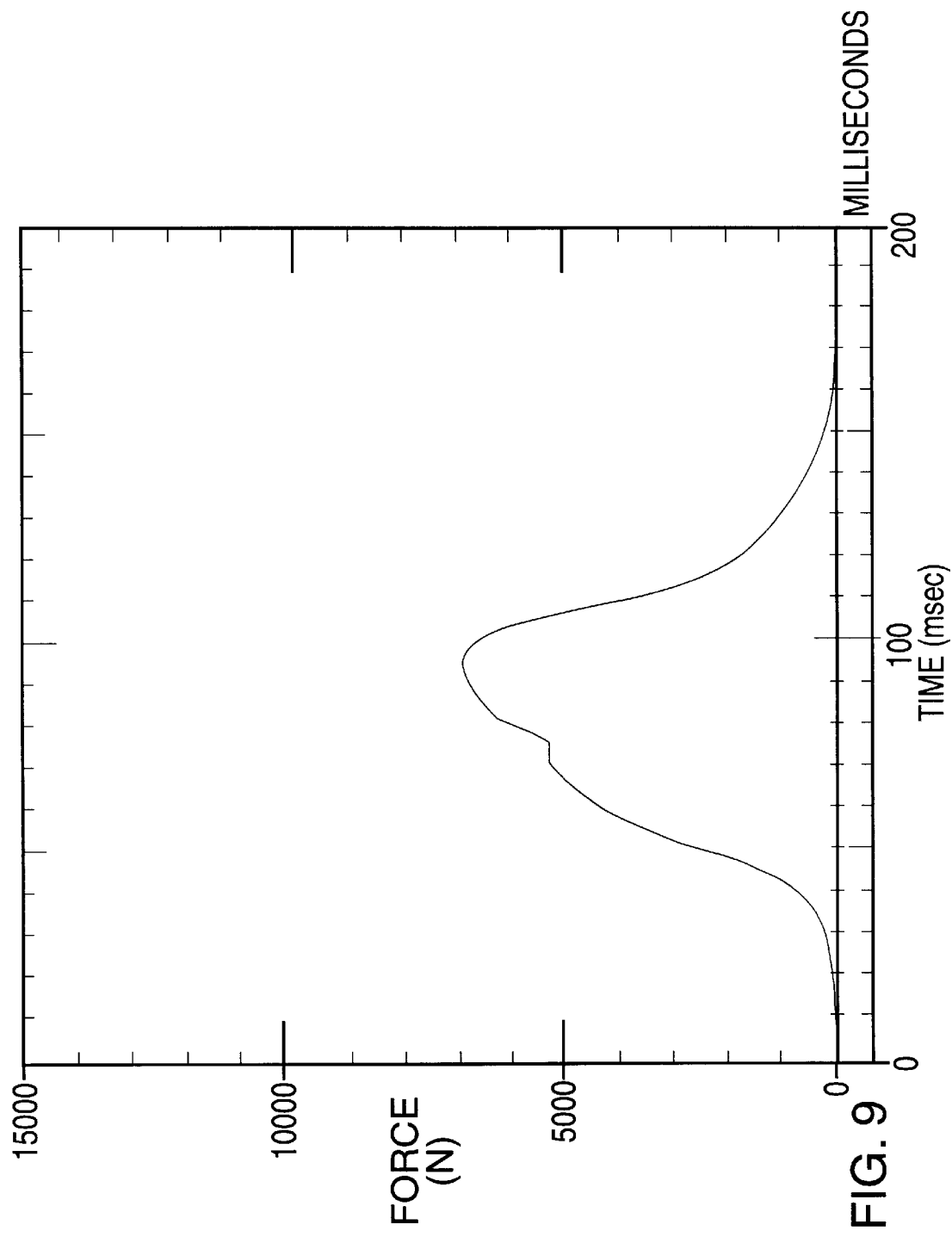
FIG. 9 illustrates the performance of the web of Inventive Example 9 at the torso position.

342 ends of 1500 denier PET/25%Polycaprolactone warp yarn from Inventive Example 3 were woven with 500 denier PET/25%Polycaprolactone weft yarn from Inventive Example 3 into 2 inch wide seat belt in a 2×2 twill pattern. The new webbing was cut to have the retractor and torso length and stitched with a PET lap belt. A super sized dummy (95th percentile hybrid) was then belted for a sled test. At 35 miles/hour speed, the time when the force peaked on the torso position were delayed to 100 msec after collision. Maximum measured force was 6800 N (1530 lb) on the torso position. As shown in FIG. 9, the new webbing performed well and showed load leveling behavior at 6,800 Newtons which is in sharp contrast to the undesirable performance of Comparative Example A in FIG. 1.

What is claimed is:

1. Dyed web comprising warp yarn, said yarn having a force-displacement profile such that:
    (a) when said yarn is subjected to an initial barrier stress of from about 0.2 gram/denier to less than or equal to about 1.4 grams/denier, said yarn elongates to less than 3 percent and the initial modulus ranges from about 20 grams/denier to about 150 grams/denier;
    (b) upon subjecting said yarn to greater than said initial barrier stress and less than or equal to 1.8 grams/denier, said yarn elongates further to at least about 10 percent and the energy absorbed from 0 to the elongation at 1.8 grams/denier is at least about 0.0008 Joule/denier·meter; and
    (c) upon subjecting said yarn to greater than 1.8 grams/denier, the modulus increases sharply and said yarn elongates further until said yarn breaks at a tensile strength of at least about 5 grams/denier, wherein said yarn comprises a multiplicity of fibers, all of said warp yarns having substantially the same force-displacement profile, are made from polymer having a glass transition temperature in the range from about −40° C. to about +70° C., and are not made from polybutylene terephthalate homopolymer.

2. The dyed web of claim 1 wherein said yarn in part (a) elongates to less than about 2 percent.

3. The dyed web of claim 1 wherein said yarn is made from homopolymers, random copolymers, diblock copolymers, triblock copolymers, and segmented block copolymers.

4. The dyed web of claim 3 wherein said yarn is made from homopolymer selected from the group consisting of polytrimethylene terephthalate; polyisobutylene terephthalate; and long chain alkylene terephthalate and naphthalate polymers.

5. The dyed web of claim 3 wherein said yarn is made from diblock copolymer.

6. The dyed web of claim 1 wherein said yarn is made from a diblock copolymer, triblock copolymer, or segmented block copolymer comprising:

(a) at least one first block of polyester wherein said first block is made from an aromatic polyester and (b) at least one second block of polyester wherein said second block is made from lactone monomer.

7. The dyed web of claim 5 wherein said diblock copolymer comprises:

(a) a first block of polyester wherein said first block is made from an aromatic polyester and (b) a second block of polyester wherein said second block is made from lactone monomer.

8. The dyed web of claim 7 wherein said aromatic polyester is selected from the group consisting of polyethylene terephthalate; polyethylene naphthalate; polyalkylene naphthalates; polycycloalkylene naphthalates; polybutylene terephthalate; and polytrimethylene terephthalate.

9. The dyed web of claim 7 wherein said aromatic polyester is selected from the group consisting of polyethylene terephthalate; polyethylene naphthalate; polyalkylene naphthalates; polycycloalkylene naphthalates; polybutylene terephthalate; and polytrimethylene terephthalate.

10. The dyed web of claim 6 wherein said aromatic polyester is polyethylene terephthalate.

11. The dyed web of claim 7 wherein said aromatic polyester is polyethylene terephthalate.

12. The dyed web of claim 6 wherein said lactone polymer is made from monomer selected from the group consisting of $\epsilon$-caprolactone, propiolactone, butyrolactone, and valerolactone.

13. The dyed web of claim 7 wherein said lactone polymer is made from monomer selected from the group consisting of $\epsilon$-caprolactone, propiolactone, butyrolactone, and valerolactone.

14. The dyed web of claim 12 wherein the amount of said lactone polymer present is selected from about 10 to about 45 weight percent so as to achieve the desired initial barrier stress and impact energy absorption with load leveling performance.

15. The dyed web of claim 13 wherein the amount of said lactone polymer present is selected from about 10 to about 45 weight percent so as to achieve the desired initial barrier stress and impact energy absorption with load leveling performance.

16. A seat belt made from said dyed web of claim 1.

* * * * *